Oct. 15, 1929.    F. V. DETWILER    1,731,769
COOKING APPARATUS
Filed Nov. 19, 1928
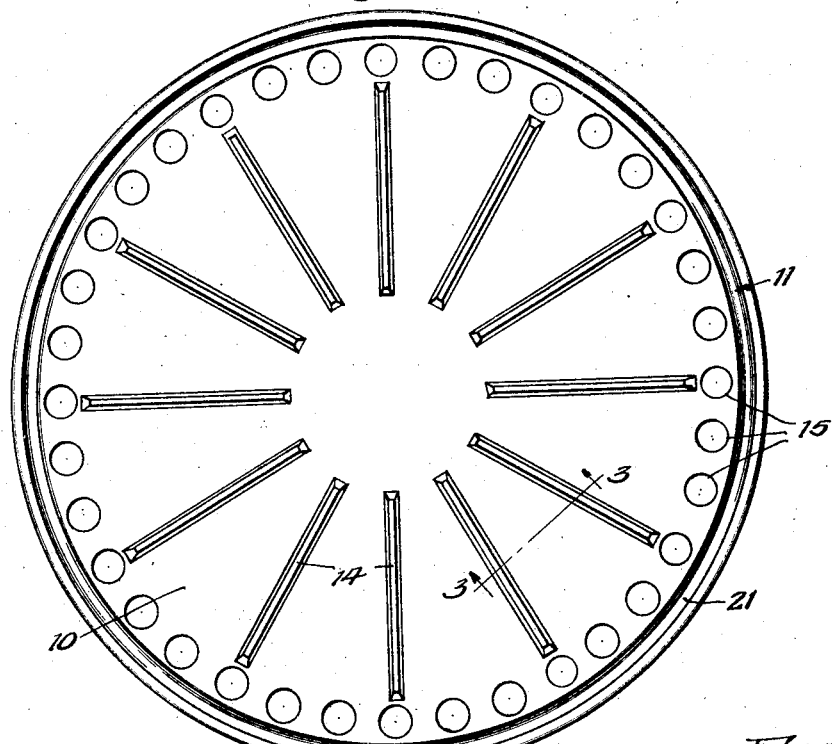
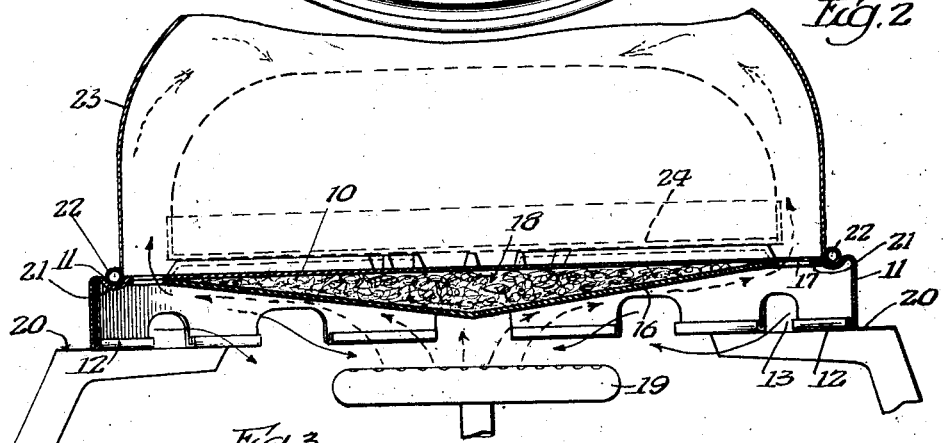
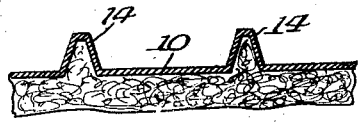
Inventor
Forest V. Detwiler Patented Oct. 15, 1929

1,731,769

UNITED STATES PATENT OFFICE

FOREST V. DETWILER, OF CHICAGO, ILLINOIS.

COOKING APPARATUS

Application filed November 19, 1928. Serial No. 320,423.

This invention relates to improvements in cooking apparatus adapted for use with a gas or a vapor stove, or with a source of supply of electric or other sufficient heat, and one of the objects of the invention is to provide an improved device of this character in which there will be an even distribution of heat, which results in an economical use of fuel and an effective and efficient use of heat for cooking materials of different kinds.

A further object is to provide an improved device of this character adapted to be stamped from sheet material with a conically arranged deflector portion depending from the bottom thereof, so that there will be a circulation of heat throughout the entire area of the cooking apparatus, the conical deflector operating to induce a flow of the heated air and products of combustion and the entire heating surface upon which the article or container for the article is placed will be maintained at a uniform heat or temperature.

A further object is to provide an improved apparatus of this character embodying a body plate and a hollow conical deflector secured to and depending below the plate, the hollow conical deflector being closed by the body plate, to form a closed receptacle within which heat retaining material such as mineral wool, steel shavings or any other suitable material may be placed.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a top plan view of a cooking apparatus of this character constructed in accordance with the principles of this invention.

Figure 2 is a vertical sectional view of the cooking apparatus showing in dotted line a portion of a cover which may be used in connection therewith.

Figure 3 is an enlarged detail sectional view taken on line 3—3, Figure 1.

Referring more particularly to the drawing the numeral 10 designates a body portion which is constructed of any suitable sheet material such as metal and may be of any desired size and configuration. The body portion 10 is formed with a depending flange 11, the bottom of which flange may, if desired, be rolled or bent as at 12 to avoid the production of a sharp edge. The flange 11 is provided with openings 13 through which outside air may enter to support combustion when a flame is employed as the heating medium. The body 10 is formed with a plurality of upwardly projecting ribs 14 of any desired size and configuration and these ribs are preferably arranged radially with respect to the top of the body portion and also preferably terminate short of the center of the body as well as short of the periphery thereof.

The body portion is provided with openings 15 therethrough which are arranged adjacent the periphery of the body and between the proximate ends of the ribs 14 and the periphery.

A conical member 16 is provided which is secured to the lower face of the body 10. The peripheral portion of the conical member 16 abuts the lower face of the body 10 and is provided with openings 17 through such portion, to register with the openings 15.

This conical member 16 is secured to the lower face of the body portion 10 in any suitable manner, preferably by spot welding and the fastening means is provided at such points as to prevent the warping or buckling of the body 10 and conical member one with respect to the other. The outer edges of the ribs 14 preferably terminate in proximity to the base of the conical member 16.

Arranged within the space formed between the conical deflector 16 and the body portion 10 is suitable heat retaining material 18 which may be of any desired substance such as mineral wool, steel shavings or any other material which will absorb heat and retain the same so as to maintain the body portion 10 heated when the flame from the burner 19 or from the source of supply, is reduced or extinguished.

In use, the body portion 10 is placed upon a suitable support 20 above the burner 19 and with the conical portion 16 directly over the burner. The heated air currents or the products of combustion from the burner 19 will contact with the conical deflector 16 and will be directed thereby toward the periphery of the deflector and also of the body portion 10. The flange 11 will form an obstruction to the heated air currents to prevent them from escaping and will cause them to be directed through the registering openings 17 and 15. The tops of the openings 13 are spaced for a considerable distance below the body portion 10 so as to trap the heated air or products of combustion within the flange 11.

While the device is in use and while the deflector 16 is being heated, the heat retaining material 18 between the deflector and the body portion 10 will absorb considerable heat and will retain the heat even when the burner 19 is lowered or extinguished. The stored up heat in the material 18 will then be radiated toward the periphery of the body portion 10, with the result that the temperature at all points with respect to the area of the body 10 will be substantially uniform.

The body portion 10 is preferably provided with a circumferential groove 21 preferably adjacent the flange 11 and into which groove the bottom or edge 22 of a cover 23 is adapted to be inserted when the cover is used, so as to confine the heat within a chamber formed by the cover 23 and the body portion 10.

Any condensation formed within the hood 23 will run down the hood and will enter and accumulate within the groove 21 in the body 10, thereby forming a water seal for the chamber within the hood.

With the use of this improved apparatus the deflector 16 will cause a uniform distribution of the heat and the heat will enter the chamber to be confined therein and circulate thereabout, with the result that the articles being cooked will be cooked equally on the top as on the bottom thereof, so that the article will be prevented from burning on the bottom before it is finished on the top.

The ribs or projections 14 serve to hold the articles or the container in which the articles are placed above and out of direct contact with the body portion 10, thereby preventing burning and permitting the heated air to circulate between the ribs 14 and also between the body portion 10 and the bottom of the container.

When a receptacle or container 24 having a handle 25 is employed in connection with this apparatus, the hood will be provided with a cut away portion to accommodate the handle.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A cooking apparatus embodying a body plate formed of sheet material and provided with upwardly projecting ribs extending from points spaced from the periphery of the plate to points adjacent the center of the plate and terminating short of each other, the upper surface of said ribs being substantially parallel with the upper surface of said plate, a downwardly projecting peripheral flange connected with said plate, and a depending conical deflector secured by its periphery to the lower face of said plate at a point intermediate the adjacent ends of said ribs and said flange to form a closed space between the deflector and said plate, there being an annular series of holes in said plate between the extremities of said ribs and the said flange.

2. A cooking apparatus embodying a body plate formed of sheet material and provided with upwardly projecting ribs extending from points spaced from the periphery of the plate to points adjacent the center of the plate and terminating short of each other, the upper surface of said ribs being substantially parallel with the upper surface of said plate, a downwardly projecting peripheral flange connected with said plate, a depending conical deflector secured by its periphery to the lower face of said plate at a point intermediate the adjacent ends of said ribs and said flange to form a closed space between the deflector and said plate, and a filling of heat retaining material in the said space, there being an annular series of holes in said plate between the extremities of said ribs and the said flange.

3. A cooking apparatus embodying a body plate formed of sheet material and provided with upwardly projecting hollow ribs open at their bottom and extending from points spaced from the periphery of the plate to points adjacent the center of the plate and terminating short of each other, the upper surface of said ribs being substantially parallel with the upper surface of said plate, a downwardly projecting peripheral flange connected with said plate, a depending conical deflector secured by its periphery to the lower face of said plate at a point intermediate the adjacent ends of said ribs and said flange to form a closed space between the deflector and said plate and with which space the space in said ribs communicate, and a filling of heat retaining material in said space and ribs, there being an annular series of holes in said plate between the said flange and the adjacent extremities of said ribs.

4. A cooking apparatus embodying a body plate formed of sheet material and provided with upwardly projecting ribs extending from points spaced from the periphery of the plate to points adjacent the center of the plate and terminating short of each other, the upper surface of said ribs being substantially parallel with the upper surface of said plate, a downwardly projecting peripheral flange connected with said plate, a depending conical deflector secured by its periphery to the lower face of said plate at a point intermediate the adjacent ends of said ribs to form a closed space between the deflector and said plate, there being an annular series of holes in said plate between the said flange and the adjacent extremities of said ribs, there being a circumferential groove opening through the upper face of the plate between said holes and the periphery of the body plate, and a cover for the plate to form with the plate a cooking chamber, the edge of the cover entering said groove whereby condensation will enter said groove and form a water seal for the chamber.

In testimony whereof I have signed my name to this specification on this 24th day of February, A. D. 1928.

FOREST V. DETWILER.